UNITED STATES PATENT OFFICE.

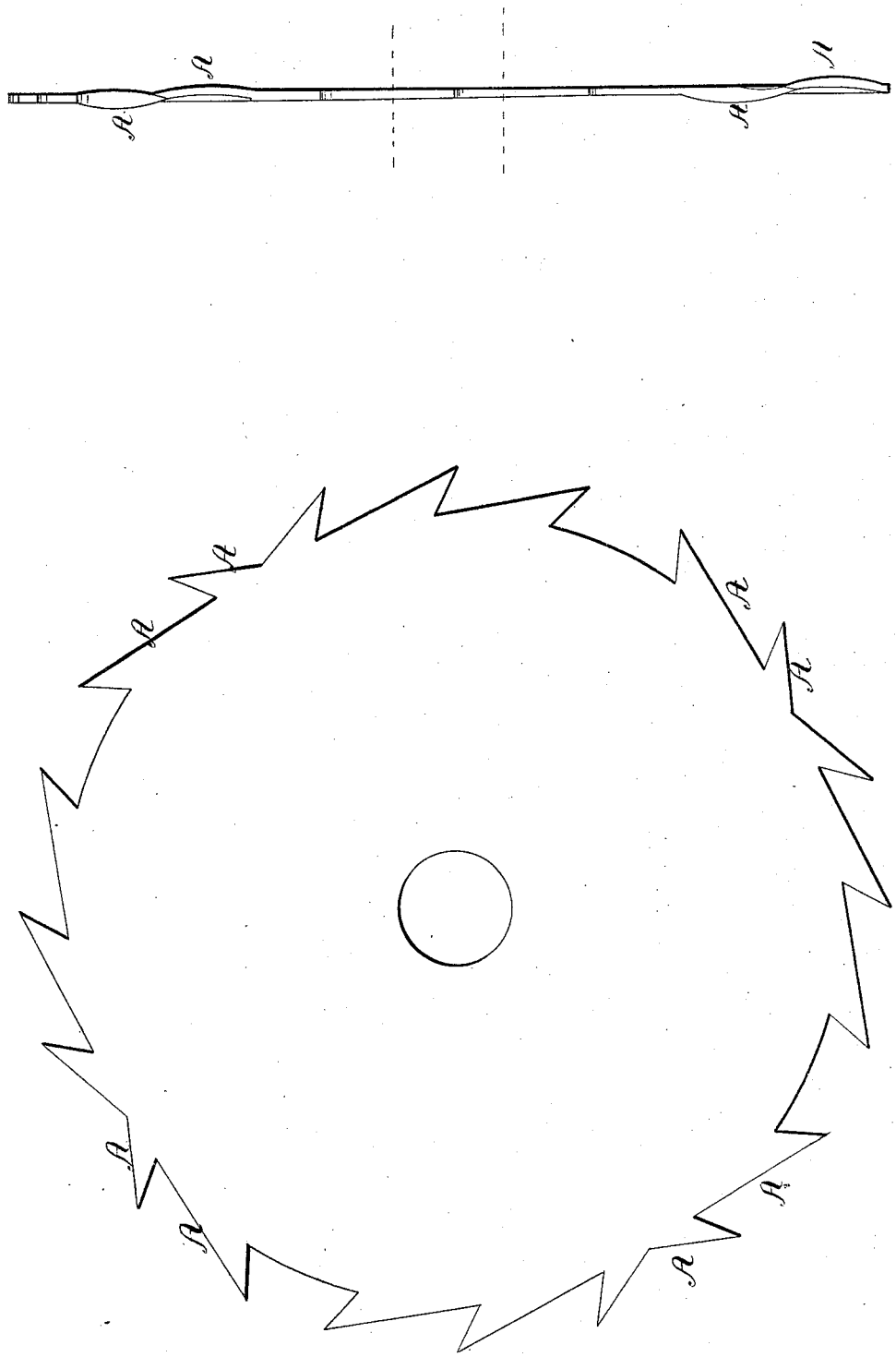

R. ANDREWS AND A. F. ANDREWS, OF AVON, CONNECTICUT.

WOOD-SAW.

Specification of Letters Patent No. 10,439, dated January 24, 1854.

*To all whom it may concern:*

Be it known that we, ROMEO ANDREWS and ALBERT F. ANDREWS, of the town of Avon, county of Hartford, and State of Connecticut, have invented a new and useful Improvement in Wood-Saws; and we do hereby declare that the following is a full and exact description of the same, reference being had to the accompanying drawings and to the letters of reference marked thereon.

The nature of our invention consists in the peculiar form of the teeth of saws made so that they shall cut and plane at once and thus save time.

To enable others skilled in the art to make and use our invention we will proceed to describe the same.

We take a saw plate of the customary make, and cut and form the teeth in the manner or nearly so as shown in the plan. One portion of the teeth are cut in the usual manner for sawing, and the other portion are cut and formed as marked letters, A, on the plan, having the appearance as if they were cut backward. These are the planing teeth and have a sharp chisel shaped edge. It is the peculiar form of these teeth that gives the merit to this invention. Instead of being set in the usual way, we curve them sidewise a small portion beyond the thickness of the plate and the thickness of a shaving beyond the set of the sawing tooth preceding. The curve of the tooth commences well down into the plate and gently curves outward up to the point which is turned inward just so as to clear the point of the set of the cutting teeth. This method of making and forming of the teeth of saws to answer the double purpose of sawing and planing at the same time can be used on any kind of saw, either circular, straight or any other kind or form. For small work it is particularly useful and economical, also can be used in large work for board sawing or other work, giving a beautiful smooth face to the same and requiring no planing afterward.

What we claim as our invention and desire to secure by Letters Patent is—

The peculiar form and relative position of the planing teeth in combination with the sawing teeth, substantially as herein described and for the purpose herein set forth.

ROMEO ANDREWS.
    ALBERT F. ANDREWS.

Witnesses:
 WM. VINE,
 JOHN B. WILKINSON.